United States Patent [19]

Xuan

[11] Patent Number: 5,965,215
[45] Date of Patent: Oct. 12, 1999

[54] METHOD FOR LASER TEXTURING A LANDING ZONE AND A DATA ZONE OF A MAGNETIC RECORDING MEDIUM

[75] Inventor: Jialuo Jack Xuan, Milpitas, Calif.

[73] Assignee: Seagate Technology, Inc., Scotts Valley, Calif.

[21] Appl. No.: 08/971,576

[22] Filed: Nov. 17, 1997

Related U.S. Application Data

[63] Continuation-in-part of application No. 08/972,229, Nov. 17, 1997, which is a continuation-in-part of application No. 08/955,448, Oct. 21, 1997, which is a continuation-in-part of application No. 08/954,585, Oct. 20, 1997
[60] Provisional application No. 60/037,627, Jan. 15, 1997.
[51] Int. Cl.⁶ ........................................................ B05D 3/00
[52] U.S. Cl. .......................... 427/554; 427/129; 427/131; 427/309; 427/402; 427/596
[58] Field of Search ................................... 427/554, 596, 427/129, 131, 309, 402

[56] References Cited

U.S. PATENT DOCUMENTS

| | | |
|---|---|---|
| 3,674,340 | 7/1972 | Jacob . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 5,062,021 | 10/1991 | Ranjan et al. . |
| 5,120,927 | 6/1992 | Williams et al. . |
| 5,128,914 | 7/1992 | Kurata et al. . |
| 5,153,785 | 10/1992 | Muranushi et al. . |
| 5,166,006 | 11/1992 | Lal et al. . |
| 5,202,810 | 4/1993 | Nakamura et al. . |
| 5,273,834 | 12/1993 | Hoover et al. . |
| 5,391,522 | 2/1995 | Goto et al. . |
| 5,402,407 | 3/1995 | Eguchi et al. . |
| 5,416,755 | 5/1995 | Endo et al. . |
| 5,550,696 | 8/1996 | Nguyen . |
| 5,595,791 | 1/1997 | Baumgart et al. . |

FOREIGN PATENT DOCUMENTS

0652554 A1  5/1995  European Pat. Off. .

OTHER PUBLICATIONS

Baumgart et al., "A New Laser Texturing Technique for High Performance Magnetic Disk Drives," IEEE Transactions on Magnetics, vol. 31, No. 6, pp. 2946–2951, Nov. 1995.

Kuo et al., "Laser Zone Texturing on Glass and Glass–Ceramic Substrates," presented at the Magnetic Recording Conference (TMRC), Santa Clara, California, Aug. 19–21, 1996.

Baumgart et al. "Safe landings: Laser texturing of high–density magnetic disks" Data Storage, Mar. 1996.

Tam, "Laser–cleaning techniques for removal of surface particulates", J. Appl. Phys. 71 (7), Apr. 1, 1992, pp. 3515–3523.

Johnson et al., "In–Plane Anisotropy in Thin–Film Media: Physical Origins of Orientation Ratio (Invited)", IEEE Transactions on Magnetics, vol. 31, No. 6, Nov. 1995, pp. 2721–2727.

Miles et al., "Micromagnetic Simulation of Texture Induced Orientation in Thin Film Media", IEEE Transactions on Magnetics, vol. 31, No. 6, Nov. 1995, pp. 2770–2772.

Kissinger et al., "Fiber–Optic Probe Measures Runout of Stacked Disks", Jul.–Aug. 1997 Data Storage, pp. 79–84.

*Primary Examiner*—Bernard Pianalto
*Attorney, Agent, or Firm*—McDermott, Will & Emery

[57] ABSTRACT

The substrate of a magnetic recording medium is laser textured with uniformity and precision employing a fiber optic laser delivery system to form a laser textured landing zone and a laser textured decoupled data zone. A continuous wave laser light beam is split into first and second continuous wave laser light sub-beams. The first continuous laser light sub-beam is impinged on a rotating substrate surface through a microfocusing lens system to laser texture a data zone. The second continuous wave laser light sub-beam is converted into a pulsed laser light beam and passed through a microfocusing lens to impinge on the substrate surface to laser texture a data zone.

18 Claims, 3 Drawing Sheets

METHOD FOR LASER TEXTURING A LANDING ZONE AND A DATA ZONE OF A MAGNETIC RECORDING MEDIUM

RELATED APPLICATIONS

This application claims priority from provisional patent application Ser. No. 60/037,627, filed Jan. 15, 1997, the entire disclosure of which is hereby incorporated by reference herein.

This application is a continuation-in-part application of U.S. patent application Ser. No. 08/972,229, filed on Nov. 17, 1998 which, in turn, is a continuation-in-part of U.S. patent application Ser. No. 08/955,448, filed on Oct. 21, 1997 which, in turn, is a continuation-in-part of U.S. patent application Ser. No. 08/954,585, filed on Oct. 20, 1997. The entire disclosures of U.S. patent application Ser. No. 08/972, 229, U.S. patent application Ser. No. 08/955,448 and U.S. patent application Ser. No. 08/954,585 are hereby incorporated by reference herein.

Some of the subject matter disclosed in this application is similar to subject matter disclosed in copending application Ser. No. 08/919,601 filed on Aug. 28, 1997 now U.S. Pat. No. 5,837,330.

TECHNICAL FIELD

The present invention relates generally to laser texturing a magnetic recording medium to provide decoupled data and landing zones. The present invention is particularly applicable to laser texturing a substrate for high areal recording density magnetic recording media.

BACKGROUND ART

Conventional magnetic disk drive designs comprise a commonly denominated Contact Start-Stop (CSS) system commencing when the head begins to slide against the surface of the disk as the disk begins to rotate. During operation, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping. A smooth recording surface is preferred, as well as a smooth opposing surface of the associated transducer head; however, a precision match of these surfaces gives rise to excessive restriction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a separate landing zone for the head, which landing zone comprises a roughened surface segment of the disk to reduce the head/disk friction. Conventional techniques for forming a landing zone comprise mechanical and laser "texturing." Typically, opposite surfaces of a disk substrate are textured to form a landing zone leaving a smooth specular surface region as the data zone in which information is recorded and read. Subsequent to texturing the landing zone, one or more underlayers, one or more magnetic layers, a protective overcoat, and a lubricant topcoat are sequentially deposited, wherein the textured landing zone is substantially replicated in the subsequently deposited layers.

The escalating requirements for high areal recording density impose increasingly greater requirements on thin film magnetic media in terms of coercivity, restriction, squareness, low medium noise and narrow track recording performance. In addition, increasingly high density and large-capacity magnetic disks require an increasingly smaller flying height, i.e., the distance by which the head floats above the surface of the disk in the CSS drive.

In texturing a substrate for a magnetic recording medium, conventional practices comprise mechanically polishing the surface to provide a data zone having a substantially smooth surface and a landing zone characterized by topographical features, such as protrusions and depressions. See, for example, Nakamura et al., U.S. Pat. No. 5,202,810. Conventional mechanical texturing techniques, however, are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. Such relatively crude mechanical polishing, with attendant non-uniformities and debris, does not provide a surface with an adequately specular finish or with adequate microtexturing to induce proper crystallographic orientation of a subsequently deposited magnetic layer on which to record and read information, i.e., a data zone.

Data zones are conventionally provided with a smooth specular finish or with a mechanically textured surface. In mechanically texturing a substrate surface for data recordation and reading, i.e., a data zone, deep scratches are formed for inducing a desired magnetic orientation. However, mechanical texturing disadvantageously results in non-uniform scratches believed to be due to non-uniform particle sizes of abrasive material ranging from about 0.1 $\mu$m to about 5 $\mu$m. In addition, various desirable substrates are difficult to process by mechanical texturing. This undesirably limiting facet of mechanical texturing, virtually excludes the use of many materials for use as substrates.

Laser technology has been employed to texture a substrate to form a topography suitable for a landing zone. Such landing zone laser technology typically comprises impinging a pulsed, focused laser light beam on a non-magnetic substrate surface. Laser textured landing zones typically exhibit a topographical profile comprising a plurality of spaced apart protrusions extending above the substrate surface or a plurality of spaced apart depressions extending into the substrate surface. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving a specular data zone. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. See, also, U.S. Pat. Nos. 5,550,696 and 5,595,791.

In copending application Ser. No. 08/666,374 filed on Jun. 27, 1996 a laser texturing technique is disclosed employing a multiple lens focusing system for improved control of the resulting topographical texture. In copending application Ser. No. 08/647,407 filed on May 9, 1996, a laser texturing technique is disclosed wherein a pulsed, focused laser light beam is passed through a crystal material to control the spacing between resulting protrusions.

In copending PCT application Ser. No. PCT/US96/06830, a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., in an article entitle "Laser Zone Texturing on Glass and Glass-Ceramic Substrates," presented at The Magnetic Recording Conference (TMRC), Santa Clara, Calif., Aug. 19–21, 1996.

In copending application Ser. No. 08/796,830 filed on Feb. 7, 1997, a method is disclosed for laser texturing a glass or glass-ceramic substrate, wherein the height of the protrusions is controlled by controlling the quench rate during resolidification of the laser formed protrusions, One of the disclosed techniques for controlling the quench rate comprises preheating a substrate, as by exposure to a first laser light beam, and then exposing the heated substrate to a focused laser light beam.

In copending application Ser. No. 08/954,585, filed on Oct. 20, 1997, an apparatus and method are disclosed for laser texturing a substrate employing a fiber-optic laser delivery system wherein sub-laser beams are passed through plural fiber optic cables and microfocusing lens to impinge on opposite surfaces of a rotating substrate. The use of a fiber optic cable delivery system facilitates alignment and reduces maintenance, even in geographical areas subject to environmental changes, particularly seismological disturbances. In copending application Ser. No. 08/955,448 filed on Oct. 21, 1997 an apparatus and methodology is disclosed wherein inherent variations in the surface topography of a disk substrate, such as variations in surface planarity, e.g., surface runout, are detected and a laser parameter adjusted in response to the detected surface variation. Such controlled texturing parameters include laser power, pulse duration, repetition rate and/or the distance between the microfocusing lens and the substrate surface.

Thus, conventional practices in texturing a non-magnetic substrate or underlayer provided thereon comprise decoupling the magnetic requirements (data zone on which information is recorded and read) from the mechanical requirements (landing zone), by forming a dedicated landing zone where the slider is parked and latched after the drive has been shut down. Baumgart et al. "Safe landings: Laser texturing of high-density magnetic disks" Data Storage, March 1996; U.S. Pat. No. 5,550,696 issued to Nguyen; and U.S. Pat. No. 5,595,791 issued to Baumgart et al. Accordingly, laser texturing has been employed to provide a landing zone having a topographical profile comprising a plurality of spaced apart protrusions extending above the substrate surface or a plurality of spaced apart depressions extending into the substrate surface. Typically, such laser texturing to provide a landing zone is performed on a non-magnetic substrate which has previously been polished by the substrate manufacturer to provide a specular or smooth surface which serves as the data zone.

Lasers have also been employed to inscribe a plurality of indelible grooves in a surface of a magnetic recording medium to function as optical servo tracks. Williams et al. U.S. Pat. No. 5,120,927. Laser techniques have also been employed to remove particular contamination from surfaces. Tam, "Laser-cleaning techniques for removal of surface particulates", J. Appl. Phys. 71 (7), Apr. 1, 1992, pp. 3515–3523.

It is recognized that the most significant magnetic properties of thin-film media are the remanence-thickness product ($M_r t$), coercivity ($H_c$) and coercive squareness (S.). The concept of orientation ratio (OR) has been defined for magnetic media as a means to quantify and understand the directional nature of magnetic properties of a magnetic recording medium. Thus, the most common definition of OR is the ratio of $M_r t$, $H_c$ or S. in the tangential direction to values in the radial direction. Thus, in-plane anisotropies impact the OR for a particular magnetic recording medium including scratch anisotropies. Thus, the mechanism for the OR results from a geometric effect and is based upon the preferential growth of crystallite chains due to a self-shadowing mechanism stemming from mechanical polishing. Johnson et al., "In-Plane Anisotropy in Thin-Film Media: Physical Origins of Orientation Ratio (Invited)", IEEE Transactions on Magnetics, Vol. 31, No. 6, November 1995, pp. 2721–2727.

Circumferential polishing or texturing of rigid disk substrates provides anisotropy in thin film magnetic disks which enhances coercivity in the track direction. The orientation in textured or polished thin film disks can be generated by a magnetostatic effects arising from effective decoupling in the cross track direction. Such magnetostatic anisotropy increases in strength as the polishing grooves become finer and deeper. This effect is stronger where there is chain growth along the track direction. Miles et al., "Micromagnetic Simulation of Texture Induced Orientation in Thin Film Media", IEEE Transactions on Magnetics, Vol. 31, No. 6, November 1995, pp. 2770–2772.

As the requirements for high areal recording density increase, the need for higher uniformity and precision in texturing a data zone for inducing magnetic orientation increases. Such improved texturing requires fine, deep and uniform scratches which cannot be achieved employing conventional mechanical polishing techniques. In copending application Ser. No. 08/972,229, an apparatus and methodology is disclosed for laser texturing a data zone of a magnetic recording medium employing a continuous wave laser light beam. The disclosed apparatus and methodology also comprises the utilization of a pulsed laser light beam for laser texturing a landing zone which is decoupled from the laser textured data zone.

There exists a need, however, for an apparatus and methodology for substantially simultaneously laser texturing a substrate surface to form decoupled data and landing zones in an efficient cost effective manner.

DISCLOSURE OF THE INVENTION

An object of the present invention is an apparatus and methodology for substantially simultaneously laser texturing a substrate to form decoupled data and landing zones for a high areal recording density magnetic recording medium.

Additional objects, advantages and other features of the invention will be set forth in each description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by an apparatus for laser texturing a substrate for a magnetic recording medium, which apparatus comprises: a spindle for rotating the substrate during laser texturing; a source for emitting a continuous wave laser light beam; a beam splitter linked to the source for splitting the continuous wave laser light beam into first and second continuous wave laser light sub-beams; a microfocusing lens system positioned proximate a surface of the substrate; and a first fiber optic cable optically linked to the beam splitter and microfocusing lens system for passing the first continuous wave laser light sub-beam from the beam splitter through the microfocusing lens system to impinge on the rotating substrate surface to laser texture a data zone.

Another aspect of the present invention is a method of manufacturing a magnetic recording medium, which method comprises: passing a continuous wave laser light beam through a beam splitter to form first and second continuous wave laser light sub-beam; and passing the first continuous wave laser light sub-beam through a microfocusing lens system to impinge on a rotating substrate surface to laser texture a data zone.

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Conventional magnetic recording media typically comprise a non-magnetic substrate having sequentially formed on opposite surfaces thereof one or more underlayers, one or more magnetic layers, a protective overcoat, typically containing carbon, and a lubricant topcoat. The non-magnetic substrate or an underlayer is typically textured to form a landing zone, as by impinging a pulsed laser light beam thereon during substrate rotation to form a plurality of uniformly spaced apart protrusions or depressions, while the data zone typically comprises a polished specular surface. For example, a conventional aluminum alloy substrate, such as aluminum-magnesium substrate having an amorphous nickel-phosphorous (NiP) plating thereon is commercially available with a specular surface; The specular surface is textured to form the landing zone while the remaining polished specular surface functions as the data zone. The data zone can also comprise a plurality of scratches formed by mechanical polishing during substrate rotation for inducing magnetic orientation in the subsequently deposited magnetic layer. The minute polishing scratches in the data zone imparted by circumferential polishing produces in-plane isotropy enhancing coercivity ($H_c$) and is impacting ($M_r t$) and S*. These properties must be optimized for high areal recording density and, hence, a data zone must be provided with greater precision and uniformity in microtexture.

In copending application Ser. No. 08/972,229 filed on Nov. 17, 1997, an apparatus and methodology is disclosed for laser texturing a data zone by impinging a continuous wave laser light beam on a rotating substrate surface, the substrate constituting either the non-magnetic substrate or the non-magnetic substrate having one or more underlayers thereon. The continuous wave laser light beam, which can be derived from a yttrium-aluminum-garnet (YAG), yttrium-lithium-fluoride (YLF) or yttrium-vanadium-oxide ($YVO_4$) laser light beam source, is passed through a microfocusing lens system and impinged on a rotating substrate surface to laser texture a data zone to provide a suitable microtopography for inducing appropriate magnetic orientation of a layer subsequently deposited magnetic layer, such as a plurality of substantially uniform, precise concentric microgrooves. The disclosed methodology and apparatus also comprises laser texturing a landing zone by impinging on the rotating substrate surface a pulsed laser light beam. The disclosed embodiments include use of an optical probe, such as a fiber optic probe as disclosed in copending application Ser. No. 08/955,448 filed on Oct. 21, 1997.

The present invention constitutes an improvement over the apparatus and methodology disclosed in copending application Ser. No. 08/972,229 filed on Nov. 17, 1997 by simplifying the apparatus and methodology in a cost effective manner to enhance production throughout and minimize maintenance. In accordance with the present invention, a single continuous wave laser light beam source is employed for laser texturing both a data zone and a landing zone, thereby simplifying the apparatus and methodology for laser texturing a substrate for a magnetic recording medium to provide a decoupled laser textured data zone comprising a plurality of substantially uniform concentric microgrooves from a landing zone comprising a plurality of substantially uniform spaced apart protrusions or depressions.

In accordance with the present invention, a primary continuous wave laser light beam derived from a YAG, YLF or $YVO_4$ is passed through a single mode fiber optic cable to a beam splitter. The beam splitter separates the primary continuous waver laser light beam into first and second continuous wave sub-light beams. One of the continuous wave laser light sub-beams, e.g., the first continuous wave laser light sub-beam, is impinged on a rotating substrate surface to form a data zone comprising a plurality of substantially uniform concentric microgrooves. The second continuous wave laser light sub-beam is converted into a pulsed laser light beam and substantially simultaneously impinged on the rotating substrate surface to form a decoupled landing zone comprising a plurality of substantially uniform spaced apart protrusions or depressions. The continuous wave laser light beam can be converted to a pulsed laser light beam employing conventional devices, such as an acoustic optical modulator (AOM), such as Model N 2380 obtained from NEOS Technologies located in Melbourne, Fla. Other suitable converters include an acoustic modulator with signal generator control and multiple beam wave blocking and mixing.

As in copending application Ser. No. 08/972,229, embodiments of the present invention include laser texturing a data zone to provide a plurality of substantially uniform, precise, concentric microgrooves spaced apart by a distance less than about is 1.0 μm, e.g., less than about 0.5 μm. Typically, the spacings and dimensions of the microgrooves do not vary more than about 10% among microgrooves. Embodiments of the present invention comprise laser texturing microgrooves having a width of about 0.2 μm to about 0.8 μm and a depth extending into the substrate surface a distance of about 10 Å to about 50 Å. The uniformity and precision of the-laser textured data zones of the present invention provides optimum in-plane isotropies and OR, thereby achieving an $M_r t$ of about 0.5 to about 1.2 and $H_c$ of about 2,500 to about 5,000.

As in copending application Ser. No. 08/972,229, embodiments of the present invention comprise passing a continuous wave laser light beam through a fiber optic cable, preferably a single mode fiber optic cable, and then through a microfocusing lens system to impinge on the rotating substrate surface to form the laser textured data zone comprising a plurality of substantially uniform concentric microgrooves.

A high repetition rate pulsed laser light beam can also be employed to form a laser textured data zone comprising a plurality of substantially uniform concentric microgrooves. For example, a pulsed laser light beam having a repetition rate of about 300 KHz to about 500 KHz can be employed to form a plurality of substantially uniform concentric microgrooves with high precision. Such a high repetition rate typically provides a pulse width of about 100 nanoseconds to about 300 nanoseconds.

A microfocusing lens system found suitable in the practice of the present invention comprises a bundle of fiber optic cables, each fiber optic cable linked to a microfocusing lens. The microfocusing lenses are arranged in an orthogonal array comprising a plurality of horizontally spaced microfocusing lenses and a plurality of vertically spaced apart microfocusing lenses. It has been found particularly suitable to employ a microfocusing lens system comprising a plurality of microfocusing lenses substantially horizontally spaced apart by a distance of about 10 μm to about 2,000 μm and a plurality of microfocusing lenses substantially vertically spaced apart by a distance of about 10 μm to about 300 μm.

In embodiments of the present invention, the decoupled data and landing zones are substantially simultaneously laser textured. The laser textured landing zone typically comprises a plurality of protrusions having a diameter of about 2 μm to about 8 μm, a height of about 60 Å to about 200 Å and a spacing of about 10 μm to about 50 μm.

As in conventional practices, the magnetic recording medium produced in accordance with the present invention comprises, sequentially, a non-magnetic substrate, at least one underlayer formed on opposite sides thereof, at least one magnetic layer formed on the underlayer, a protective overcoat formed on a magnetic layer and a lubricant topcoat formed on a protective overcoat. In accordance with embodiments of the present invention, the non-magnetic substrate or underlayer thereon is laser textured to substantially simultaneously form decoupled data and landing zones which are substantially reproduced on layers subsequently deposited thereon.

In practicing the present invention, fiber optic cable laser delivery system can be employed for optimum maintenance as disclosed in copending application Ser. No. 08/954,585. In practicing the present invention, features of the apparatus and methodology disclosed in copending application Ser. No. 08/972,229 filed on Nov. 17, 1997 can also be employed, such as the microfocusing lens system and continuous wave laser light beam source.

Embodiments of the present invention also involve utilization of an optical probe, e.g., a fiber optic probe positioned in proximity to the rotating substrate surface during laser texturing and an optical feedback data processing and control system as disclosed in copending application Ser. No. 08/955,448 filed on Oct. 21, 1997. In such embodiments, the fiber optic probe detects surface variations, including subtle variations in planarity, e.g., inherent surface waviness or runout. Light signals indicative of any such surface variations are fed back to an optical feedback data processing and control system wherein the light signals are converted into electrical signals in an associated interface module housed therein, the data analyzed and a laser parameter and/or the distance between a microfocusing lens or a microfocusing lens array and the substrate surface adjusted. The optical feedback data processing and control system contains an associated computer and a laser controller linked to a continuous wave laser light beam source and to a pulsed laser light beam source. The laser optic systems can comprise an automatic attenuator for appropriate adjustment of the power of the laser light beam in response to sensed surface variations to ensure uniform laser texturing. The distance between the microfocusing lens for laser texturing the landing zone and the substrate surface, and the distance between the microfocusing lens array for laser texturing the data zone and the substrate surface, can also be adjusted in response to a detected surface variation, in lieu of or in addition to adjusting a laser parameter, to insure uniform laser texturing of the data zone and landing zone. The distance between the microfocusing lens array or microfocusing lens and substrate surface can be varied using conventional means, such as a through-the-lens autofocus optical system, a capacitance probe distance detector or other proximate control devices.

Thus, embodiments of the present invention include positioning a microfocusing lens and a microfocusing lens array at a distance of about 500 μm to about 1,500 μm from opposite surfaces of a substrate on a rotating spindle. Optical probes, such as fiber optic probes, are positioned proximate opposite surfaces of the substrate during data and landing zone laser texturing to detect surface variations, such as surface planarity variations stemming from inherent waviness or surface runout. The fiber optic probes are linked to an optical feedback data processing and control system comprising a fiber optic probe-interface module, a processor with associated conventional peripheral equipment and laser controller for adjusting a relevant data or landing zone laser texturing parameter in response to a detected surface variation. The optical feedback data processing and control system can also comprise a mechanism controller linked to the microfocusing lenses and microfocusing lens arrays for adjusting the distance between each microfocusing lens and microfocusing lens array and opposite substrate surfaces and, hence, the focus to maintain uniform precision during texturing.

The optical feedback data processing and control system of the present invention typically comprises a laser controller which is linked to laser heads which, in turn, are linked to the automatic attenuator for adjusting the laser power in response to a detected surface variation for uniform texturing. Upon detecting an elevation, the laser power can be reduced or discontinued in response thereto, or the distance between the microfocusing lens system and substrate surface increased in laser texturing the data zone. The pulse duration and repetition rate can be adjusted in response to a detected surface variation in combination with the power and/or distance between the microfocusing lens and substrate surface in laser texturing a landing zone. For example, upon detecting a surface elevation, the pulse duration can be reduced, the repetition rate reduced and/or the distance between the substrate and a microfocusing lens system increased in laser texturing a landing zone.

Figure 1:
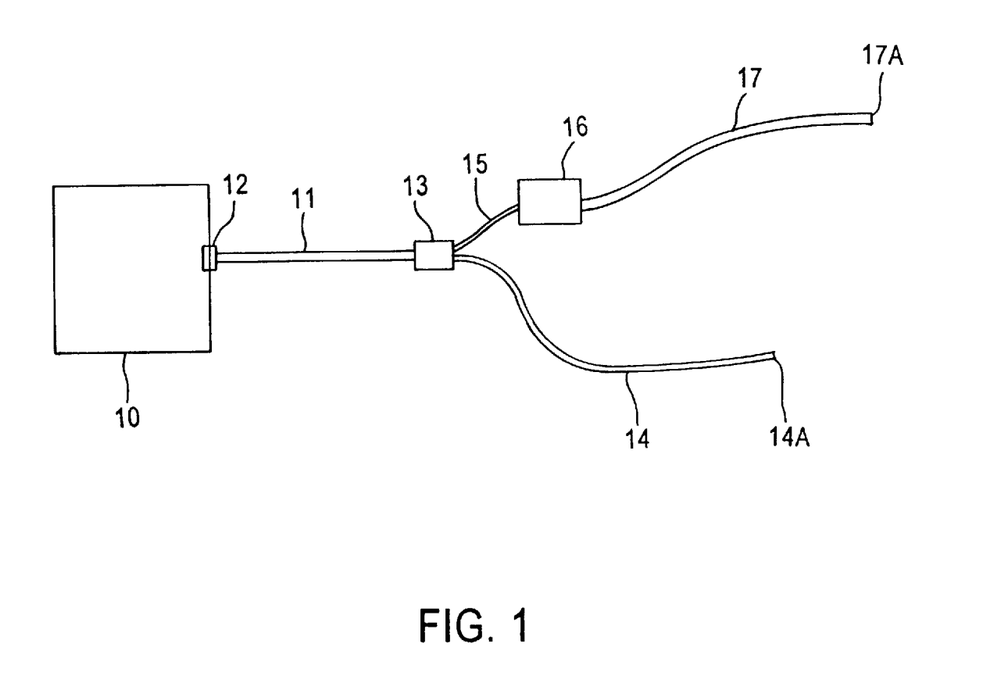
FIG. 1 schematically illustrates an embodiment of the present invention.

Am embodiment of the present invention is schematically illustrated in FIG. 1 and comprises continuous wave laser light beam source 10 optically coupled via 12 to fiber optic cable 11 which is optically coupled to beam splitter 13. In accordance with the embodiment depicted in FIG. 1, a continuous wave laser light beam emitted from continuous wave laser light beam source 10 is passed through fiber optic cable 11 and split by beam splitter 13 into a first continuous wave laser light sub-beam which is passed through fiber optic cable 14, and a second continuous wave laser light sub-beam which is passed through fiber optic cable 15 to converter 16 wherein it is converted to a pulsed laser beam and passed through fiber optic cable 17. Thus, the present invention comprises an apparatus and methodology which simplifies substantially simultaneously laser texturing a substrate surface to form decoupled laser textured data and landing zones in a cost effective manner.

Figure 2:
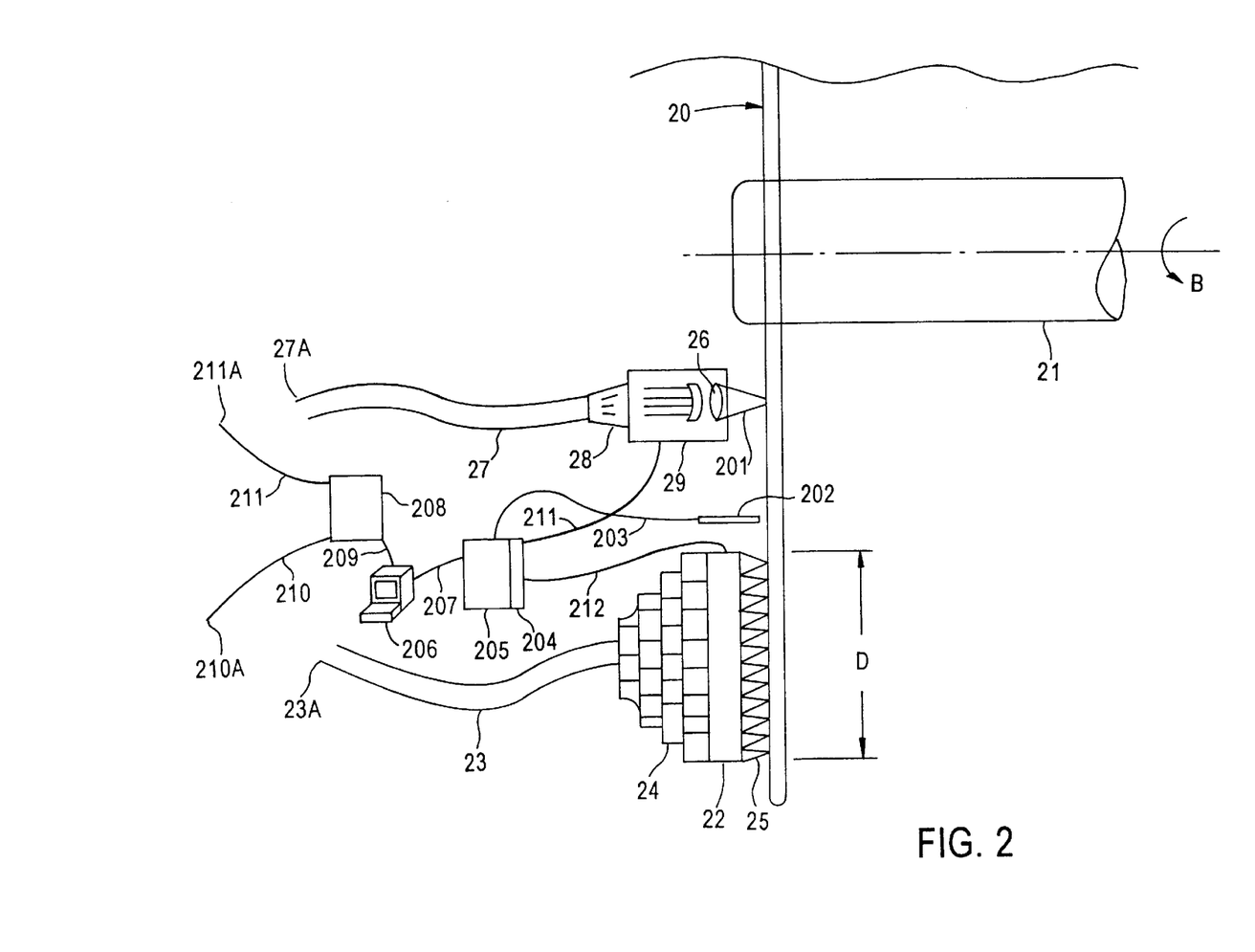
FIG. 2 schematically illustrates a laser texturing apparatus in accordance with an embodiment of the present invention.

The apparatus depicted to FIG. 2 is similar to the apparatus depicted in FIG. 2 of copending application Ser. No. 08/972,229 in that it comprises elements for laser texturing decoupled data and landing zones. Adverting to FIG. 2, substrate surface 20 is rotated on spindle 21 in the direction of arrow B. Data zone D is laser textured employing microfocusing lens system 22 comprising a plurality of microfocusing lenses through which a continuous wave laser light beam is impinged to form a plurality of is substantially uniform concentric microgrooves on rotating substrate surface 20. Each microfocusing lens of the microfocusing lens array is coupled to an optical fiber of a bundle (not shown) within multilevel optical fiber coupling 24. Fiber optic cable 23 optically links multilevel optical fiber coupling 24 to a continuous wave laser light beam. In the embodiment depicted in FIG. 2, a landing zone is substantially simultaneously laser textured on rotating substrate surface 20 by impinging a pulsed laser light beam thereon through microfocusing lens 26 optically linked to fiber optic cable 27 via a fiber optic coupling 28 and snap-on columnator 29. The focused continuous wave laser light beams 25 is impinged on rotating substrate 20 to laser texture a data zone comprising a plurality of substantially uniform concentric grooves, while focused pulsed laser light beam 201 is substantially simultaneously impinged on rotating substrate 20 to laser texture a landing zone comprising a plurality of substantially uniform spaced apart protrusions.

In the embodiment depicted in FIG. 2, a fiber optic probe 202 is positioned proximate rotating substrate surface 20 for detecting a surface variation. Fiber optic probe 202 is linked via fiber optic cable 203 to an optical feedback data processing and control system comprising processor 205 and peripheral terminal 206 via 207. Processor 205 is linked to laser controller 208 via 209, while laser controller 208 is linked via 210 to a continuous wave laser light beam path for controlling the laser light beam power in response to a surface variation detected by fiber optic probe 202. Laser control 208 is also linked via 211 to a pulsed laser light beam path for adjusting a laser texturing parameter in response to a surface variation detected by fiber optic probe 202. Processor 205 also includes displacement mechanism controller 204 which is linked to microfocusing lens array 22 via 212 for adjusting the distance between microfocusing lens system 22 and rotating substrate surface 20 in response to a surface variation detected by fiber optic probe 202 Displacement mechanism controller 204 is also linked to microfocusing lens 29 via 211 for adjusting the distance between microfocusing lens 209 and rotating substrate surface 20 in response to a surface variation detected by fiber optic probe 202.

Adverting to FIG. 2, the present invention constitutes an improvement over the FIG. 2 apparatus of copending application Ser. No. 08/972,229, in that terminal portion 23A of fiber optic cable 23 is linked to terminal portion 14A of fiber optic cable 14 (FIG. 1) through which first continuous wave laser light sub-beam is passed. In addition, terminal portion 27A of fiber optic cable 27 (FIG. 2) is linked to terminal portion 17A of fiber optic cable 17 (FIG. 1) through which the pulsed laser light beam is passed. Thus, the present invention greatly facilitates substantially simultaneously laser texturing a substrate of a magnetic recording medium to form decoupled laser textured data and landing zones. In addition, the apparatus employed for laser texturing a substrate for a magnetic recording medium to provide the coupled laser textured data and landing zones is greatly simplified resulting in an overall cost reduction, reduced maintenance and increased throughput.

Figure 3:
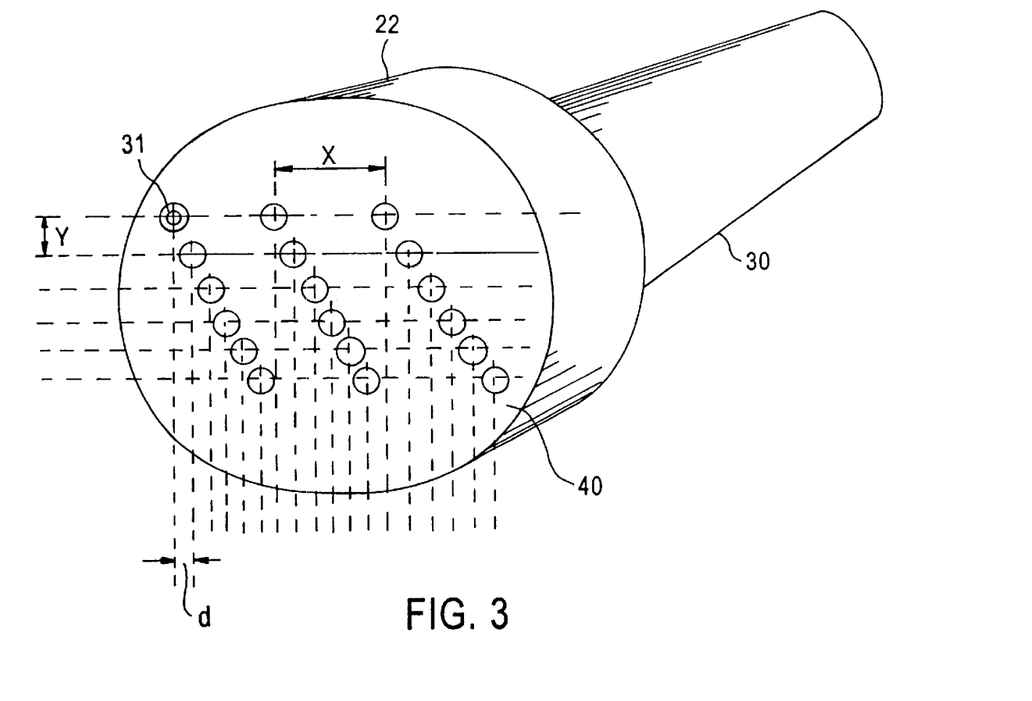
FIG. 3 illustrates an orthogonal microfocusing lens array for use in the present invention.
Figure 4:
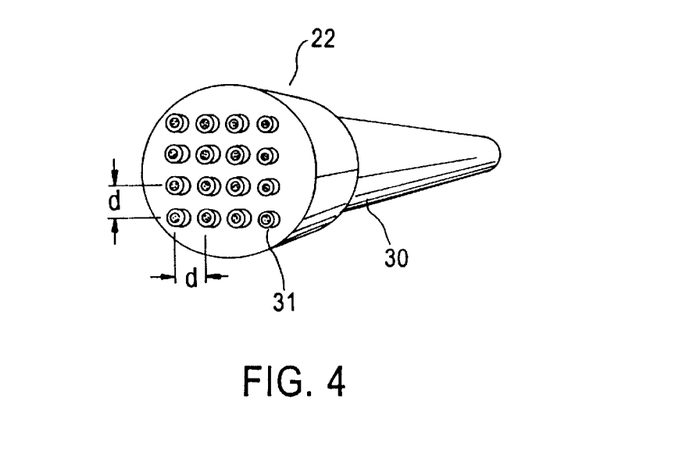
FIG. 4 illustrates a rectangular array of microfocusing lenses for use in the present invention.

The microfocusing lens array 22 employed in the present invention can be that disclosed in copending application Ser. No. 08/972,229 which comprises a fiber optic bundle within housing 30, each fiber optic cable leading to a microfocusing lens 31. In the embodiment depicted in FIG. 3, the microfocusing lenses of the microfocusing lens array are arranged in an array comprising a plurality of microfocusing lenses substantially horizontally spaced apart by a distance X of about 500 $\mu$m to about 2,000 $\mu$m and a plurality of microfocusing lenses substantially vertically spaced apart by a distance Y of about 100 $\mu$m to about 300 $\mu$m. In another embodiment of the present invention, as depicted in FIG. 4, the microfocusing lens array comprises a substantially rectangular array of substantially horizontally spaced apart microfocusing lenses and substantially vertically spaced apart microfocusing lenses, by a similar distance d, e.g., about 10 $\mu$m to about 50 $\mu$m.

In another embodiment of the present invention, a pulsed laser light beam source is employed to generate a pulsed laser light beam having a high repetition rate of about 300 KHz to about 500 KHz which is split into two pulsed sub-laser light beams employing a conventional beam splitter One of the pulsed sub-laser light beams is employed to laser texture a data zone, typically has a pulse repetition rate of about 70 KHz and a pulse width of about 70 nanoseconds. The rate of the repetition rate of the other pulsed sub-laser light beam is then reduced, as by using a conventional acoustic optical modulator, and impinged on the rotating substrate to laser texture the data zone, e.g., at a repetition rate of about 70 KHz and a pulse width of about 70 nanoseconds.

Embodiments of the present invention involve the use of conventional components which are commercially available. For example, the fiber optical probes employed in the present invention can be obtained from MTI located in Lantham, N.Y. The fiber optic probes for use in the present invention can also comprise a plurality of light transmitting fibers and a plurality of light receiving fibers. See, for example, Kissinger et al., "Fiber-Optic Probe Measures Runout of Stacked Disks", July–August 1997 Data Storage, pages 79–84. The use of control systems for responding to detected surface variations has previously been employed. See, for example, Muranushi et al., U.S. Pat. No. 5,153,785, the entire disclosure of which is incorporated herein by reference.

In practicing the present invention, the substrate can be any substrate typically employed in the manufacture of magnetic recording media, such as a metal substrate or an alternate substrate comprising a glass, ceramic or glass-ceramic material or such as O'Hara, Hoya and Nippon glass. Other conventional substrates include aluminum alloy substrates with a coating thereon, such as nickel-phosphorous. It has been found suitable to employ a $CO_2$ laser when texturing a glass, ceramic or glass-ceramic substrate, and YLF, $YVO_4$, and YAG lasers when texturing a NiP or metal substrate.

As one having ordinary skill in the art would recognize, conventional practices in manufacturing a magnetic recording medium comprise texturing opposite surfaces of a substrate and depositing a plurality of layers thereon. As one having ordinary skill in the art would also recognize, after laser texturing opposite substrate surfaces in accordance with the present invention, conventional layers are deposited thereon to complete the magnetic recording medium. For example, various conventional magnetic recording media comprise sequentially sputter deposited layers on the substrate, such as an underlayer, magnetic alloy layer and protective overcoat. A lubricant topcoat is also conventionally applied to the protective topcoat.

The magnetic layers deposited in accordance with the present invention can be any of those conventionally employed in the production of magnetic recording media. Such conventional magnetic alloys, include, but are not limited to, cobalt (Co) alloys, such as Co-base alloys, e.g., cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, one or more underlayers can be deposited on the textured substrate prior to depositing the magnetic layer. The underlayer can comprise chromium or a chromium-alloy, such as chromium-vanadium or chromium-titanium, oxygen-doped chromium, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention can be employed to produce any of various types of magnetic recording media, including thin film disks, with an attendant improvement in flying stability, glide performance and head-medium interface reliability. The present invention advantageously enables laser texturing a substrate surface to substantially simultaneously form a data zone comprising substantially uniform and precise concentric microgrooves and a decoupled landing zone comprising a plurality of substantially uniform spaced apart protrusions or depressions. The present invention can be employed to produce any of the various types of magnetic recording media, particularly high areal recording density magnetic recording media exhibiting optimized in-plane anisotropies and OR.

Only the preferred embodiment of the invention and but a few examples of its versatility are shown and described in the present invention. It is to be understood that the invention is capable of use in various other combinations and environments and is capable of changes or modifications within the scope of the inventive concept as expressed herein.

What is claimed is:

1. A method of manufacturing a magnetic recording medium, which method comprises:
    passing a continuous wave laser light beam through a beam splitter to form first and second continuous wave laser light sub-beam; and
    passing the first continuous wave laser light sub-beam through a microfocusing lens system to impinge on a rotating substrate surface to laser texture a data zone.

2. The method according to claim 1, further comprising:
    converting the second continuous wave laser light sub-beam into a pulsed laser light beam; and
    passing the pulsed laser light beam through a microfocusing lens to impinge on the rotating substrate surface to laser texture a landing zone.

3. The method according to claim 1, comprising passing the first continuous wave laser light sub-beam to the microfocusing lens system through a first fiber optic cable.

4. The method according to claim 3, wherein the first fiber optic cable is a single mode fiber optic cable.

5. The method according to claim 3, comprising passing the pulsed laser light beam to the microfocusing lens through a second fiber optic cable.

6. The method according to claim 2, comprising converting the second continuous wave laser light sub-beam into a pulsed laser light sub-beam through an acoustic optical modulator.

7. The method according to claim 2, further comprising:
    detecting a variation in the planarity of the substrate surface; and
    controlling a data zone and/or landing zone texturing parameter in response to the detected surface variation.

8. The method according to claim 1, wherein the microfocusing lens system comprises a bundle of fiber optic cables, each fiber optic cable linked to a microfocusing lens.

9. The method according to claim 8, wherein the microfocusing lens system comprises a plurality of microfocusing lenses arranged in an array comprising a plurality of substantially horizontally spaced apart microfocusing lenses and a plurality of substantially vertically spaced apart microfocusing lenses.

10. The method according to claim 8, wherein a plurality of microfocusing lenses are substantially horizontally spaced apart by a distance of about 10 $\mu$m to about 2,000 $\mu$m; and
    a plurality of microfocusing lenses are substantially vertically spaced apart by a distance of about 10 $\mu$m to about 300 $\mu$m.

11. The method according to claim 8, wherein the plurality of microfocusing lenses are arranged in a substantially rectangular array of substantially horizontally spaced apart microfocusing lenses by a distance of about 10 $\mu$m to about 50 $\mu$m and substantially vertically spaced apart microfocusing lenses by substantially the same distance of about 10 $\mu$m to about 50 $\mu$m.

12. The method according to claim 1, comprising laser texturing the data zone to form a plurality of substantially uniform concentric microgrooves.

13. The method according to claim 12, wherein the microgrooves are spaced apart by a distance of less than about 1.0 μm.

14. The method according to claim 13, wherein the microgrooves are spaced apart by a distance of less than about 0.5 μm.

15. The method according to claim 12, comprising laser texturing a landing zone to form a plurality of spaced apart substantially uniform protrusions or depressions.

16. The method according to claim 15, comprising laser texturing a landing zone to form a plurality of substantially uniform protrusions having a diameter of about 2 μm to about 8 μm, a height of about 60 Å to about 200 Å and a spacing of about 10 μm to about 50 μm.

17. The method according to claim 15, wherein the substrate is a non-magnetic substrate, which method further comprises depositing on the textured non-magnetic substrate, sequentially:

at least one underlayer;

a magnetic layer;

a protective overcoat; and a lubricant topcoat; wherein, the laser textured landing zone and the laser textured data zone on the non-magnetic substrate surface are substantially reproduced in the subsequently deposited layers.

18. The method according to claim 12, wherein each microgroove has a width of about 0.2 μm to about 0.8 μm and extends into the substrate surface to a depth of about 10 Å to about 50 Å.

\* \* \* \* \*